US012665482B2

(12) United States Patent
Palomino et al.

(10) Patent No.: US 12,665,482 B2
(45) Date of Patent: Jun. 23, 2026

(54) MOVING MAGNET TILT ACTUATOR

(71) Applicant: Raytheon Company, Waltham, MA (US)

(72) Inventors: Steven C. Palomino, McKinney, TX (US); Mikhail Godkin, San Diego, CA (US)

(73) Assignee: Raytheon Company, Arlington, VA (US)

( * ) Notice: Subject to any disclaimer, the term of this patent is extended or adjusted under 35 U.S.C. 154(b) by 994 days.

(21) Appl. No.: 17/809,156

(22) Filed: Jun. 27, 2022

(65) Prior Publication Data

US 2023/0421038 A1 Dec. 28, 2023

(51) Int. Cl.
*H02K 41/035* (2006.01)
*G02B 7/182* (2021.01)

(52) U.S. Cl.
CPC ....... *H02K 41/0358* (2013.01); *G02B 7/1821* (2013.01)

(58) Field of Classification Search
CPC .............. H02K 41/0358; G02B 7/1821; G02B 26/105; G02B 26/0816; H01F 7/081; H01F 7/02; H01F 7/122
See application file for complete search history.

(56) References Cited

U.S. PATENT DOCUMENTS

| | | | |
|---|---|---|---|
| 6,775,043 B1 | 8/2004 | Leung | |
| 10,203,475 B2 * | 2/2019 | Balaban | ............. G02B 26/0816 |
| 10,473,889 B2 | 11/2019 | Li et al. | |
| 10,488,631 B2 | 11/2019 | Bachar et al. | |
| 2020/0128164 A1 | 4/2020 | Balaban et al. | |
| 2020/0333555 A1 | 10/2020 | Wu et al. | |
| 2021/0048650 A1 | 2/2021 | Yedid et al. | |
| 2021/0141191 A1 | 5/2021 | Böhme | |

FOREIGN PATENT DOCUMENTS

| | | |
|---|---|---|
| CN | 109510425 A | 3/2019 |
| CN | 110262036 B | 11/2020 |
| CN | 113341533 A | 9/2021 |
| JP | 2001075031 A | 3/2001 |
| KR | 102374619 B1 | 3/2022 |
| WO | 2003065080 A2 | 8/2003 |

OTHER PUBLICATIONS

International Search Report and Written Opinion issued for corresponding International Application No. PCT/US2023/015882, mailed Jul. 6, 2023.

* cited by examiner

*Primary Examiner* — James C. Jones

(57) ABSTRACT

A moving magnet voice coil actuator includes a bobbin that defines a non-straight opening for receiving a magnetic piece. The bobbin may be additively manufactured to a desired shape. The moving magnetic piece may be a curved piece that has a shape that corresponds to the shape of the opening. The magnetic piece may include a stack of magnets, which may be tapered, to allow limited tilting movement of the magnetic piece within the opening. The actuator may be part of a pair of actuators for tilting an object, for example a mirror, about a pivot point. The pair of actuators may be part of a system that includes an additional pair of actuators configured to tilt the object in a second direction that is different from the first direction.

20 Claims, 4 Drawing Sheets

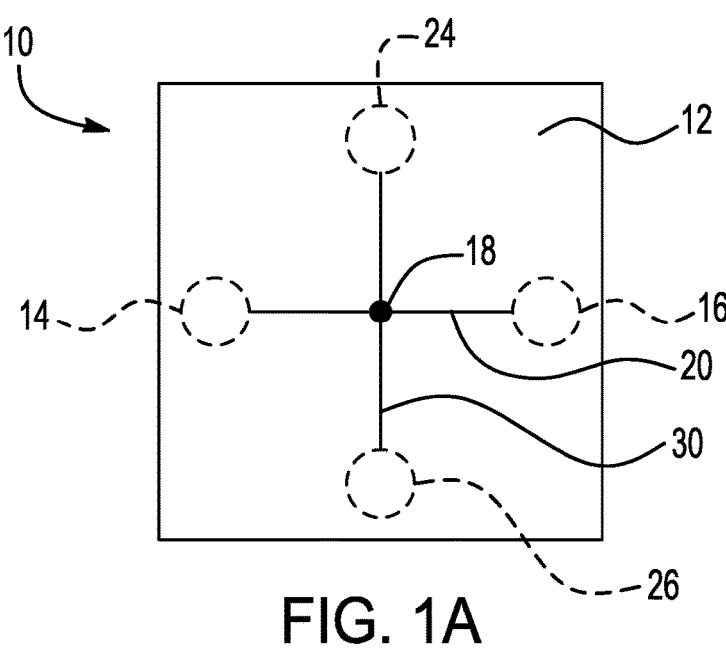
FIG. 1A
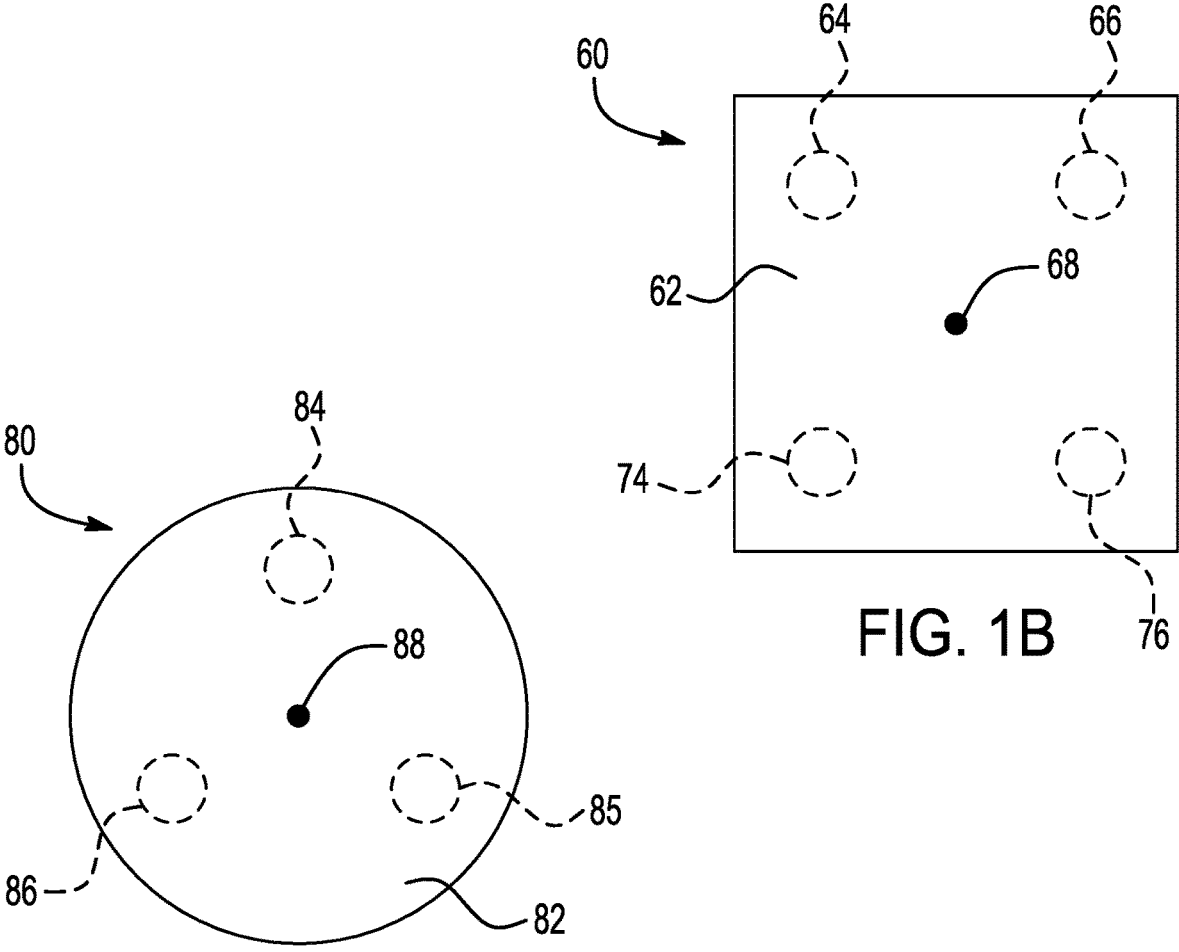
FIG. 1B
FIG. 1C

210

214

228    212    256    252

230    241    245

216

238    249    236    254    243    247    240

310

328    314    353    352    356

330

340

338    354    316

410

CONFIGURE ACTUATOR — 412

MOVE MAGNETIC PIECES — 414

MOVING MAGNET TILT ACTUATOR

FIELD

The disclosure is in the field of actuators, such as moving-magnet voice coil actuators, for tilting or otherwise moving objects.

BACKGROUND

Fast steering mirrors (FSMs) are used for applications such as laser beam stabilization, laser pointing, tracking, and image stabilization. It is desirable for FSMs to have fast reaction times, and to allow for a large range of tilt, while also provide a compact size. Voice coil actuators have been employed to for tilting FSMs, but have been limited in their performance, due to physical interference between magnets and bobbins.

SUMMARY

A voice coil actuator includes a bobbin that defines a non-straight opening therein for receiving a magnetic piece. The non-straight opening may allow for a greater range of travel, and/or more efficient operation.

An actuator system includes multiple moving-magnet voice coil actuators configured to tilt an object, with each of the actuators including a non-straight magnetic piece that engages a non-straight bobbin opening.

According to an aspect of the disclosure, an actuator includes: a moving magnetic piece; a bobbin defining an opening through which the moving magnet moves; and one or more wire coils around the bobbin; wherein the opening is a non-straight opening.

According to an embodiment of any paragraph(s) of this summary, the non-straight opening is a curved opening.

According to an embodiment of any paragraph(s) of this summary, the non-straight opening is a kinked opening.

According to an embodiment of any paragraph(s) of this summary, the bobbin is an aluminum bobbin.

According to an embodiment of any paragraph(s) of this summary, the bobbin is an additively-manufactured bobbin.

According to an embodiment of any paragraph(s) of this summary, the wire coils include a single coil wrapped around substantially all of a length of the bobbin.

According to an embodiment of any paragraph(s) of this summary, the wire coils include separate wire coils along respective portions of a length of the bobbin.

According to an embodiment of any paragraph(s) of this summary, the magnetic piece includes a stack of magnets.

According to an embodiment of any paragraph(s) of this summary, the stack of magnets has a curved shape.

According to an embodiment of any paragraph(s) of this summary, the magnetic piece includes pole pieces on ends of the stack of magnets.

According to an embodiment of any paragraph(s) of this summary, the magnetic piece includes an additional pole piece between the pole pieces on the ends of the stack.

According to an embodiment of any paragraph(s) of this summary, the stack of magnets is a tapered stack of magnets, with magnets varying in width along the stack.

According to an embodiment of any paragraph(s) of this summary, the magnets include a narrowest magnet at a free end of the magnetic piece.

According to another embodiment, an actuator system includes an actuator with features of any paragraph(s) of this summary, wherein the actuator of is a first actuator that is used in combination with a second actuator.

According to an embodiment of any paragraph(s) of this summary, the actuator system has the first actuator and the second actuator on opposite sides of a pivot point, with the first actuator and the second actuator being a first pair of actuators used to tilt an object about the pivot point.

According to an embodiment of any paragraph(s) of this summary, wherein the actuator system further includes a second pair of actuators, a third actuator and a fourth actuator, to tilt the object about the pivot point; wherein the first pair of actuators tilt the object in a first direction; wherein the second pair of actuators tilt the objection in the second direction; and wherein the first direction is different from the second direction.

According to an embodiment of any paragraph(s) of this summary, the first direction is perpendicular to the second direction.

According to an embodiment of any paragraph(s) of this summary, the first pair of actuators is configured to tilt the object a first range of angles in the first direction; and wherein the second pair of actuators is configured to tilt the object a second range of angles in the second direction, with the second range of angles different from the first range of angles.

According to an embodiment of any paragraph(s) of this summary, the bobbin is a metal bobbin.

According to an embodiment of any paragraph(s) of this summary, the non-straight opening is defined by a curved inner surface of the bobbin.

According to an embodiment of any paragraph(s) of this summary, the wire coils include a single coil wrapped around most of a length of the bobbin.

According to an embodiment of any paragraph(s) of this summary, the wire coils include copper wire.

According to an embodiment of any paragraph(s) of this summary, the curved shape of the magnet stack corresponds to a shape of the opening.

According to an embodiment of any paragraph(s) of this summary, the stack of magnets extends from a secured end to a free end.

According to an embodiment of any paragraph(s) of this summary, the magnetic piece includes an arced magnet.

According to an aspect, an actuator system for tilting a mirror (or another suitable object) includes: actuators for tilting the mirror; wherein each of the actuators includes: a moving magnetic piece; a bobbin defining an opening through which the moving magnet moves; and one or more wire coils around the bobbin; wherein the opening is a non-straight opening.

According to an aspect of the disclosure, an actuator system for tilting a mirror (or another suitable object) includes: a first pair of actuators for tilting the mirror in a first direction; and a second pair of actuators for tilting the mirror in a second direction that is perpendicular to the first direction; wherein each of the actuators of the first pair of actuators and the second pair of actuators includes: a moving magnetic piece; a bobbin defining an opening through which the moving magnet moves; and one or more wire coils around the bobbin; wherein the opening is a non-straight opening.

According to yet another aspect of the disclosure, a method of tilting an object includes the steps of: providing each actuator of an actuator system with magnetic pieces in non-straight openings in bobbins; and moving the magnetic pieces within the non-straight openings to tilt the object.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 1A is a plan view schematically showing an actuator system according to an embodiment.

FIG. 1B is a plan view schematically showing an actuator system according to a second embodiment.

FIG. 1C is a plan view schematically showing an actuator system according to a third embodiment.

DETAILED DESCRIPTION

Figure 2:
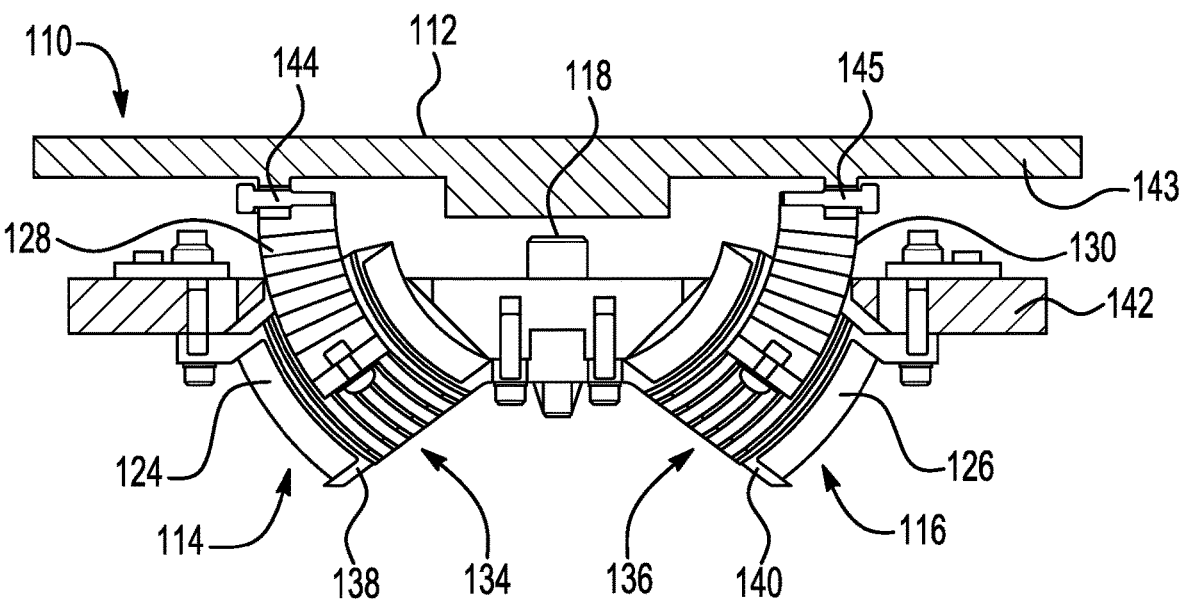
FIG. 2 is a side sectional view showing an actuator system according to another embodiment.

A moving magnet voice coil actuator includes a bobbin that defines a non-straight opening for receiving a magnetic piece. The bobbin may be additively manufactured to a desired shape. The moving magnetic piece may be a curved piece that has a shape that corresponds to the shape of the opening. The magnetic piece may include a stack of magnets, which may be tapered, to allow limited tilting movement of the magnetic piece within the opening. The actuator may be part of a pair of actuators for tilting an object, for example a mirror, about a pivot point. The pair of actuators may be part of a system that includes an additional pair of actuators configured to tilt the object in a second direction that is different from the first direction.

FIG. 1A shows an actuator system 10 for tilting an object 12 in two directions. The object 12 may be a mirror, such as a fast steering mirror (FSM). Alternatively the object 12 may another type of device, such as absorber for absorbing energy.

The system 10 includes a first pair of actuators 14 and 16 for tilting the object 12 about a pivot point 18 in a first direction, rotating the object 12 about a first axis 20. The system 10 also includes a second pair of actuators 24 and 26 for tilting the object 12 about the pivot point 18 in a second direction, rotating the object 12 about a second axis 30. In the illustrated embodiment the axes 20 and 30 intersect and are in different directions, for example being perpendicular to one another.

The system 10 may be configured so that the object 12 may tilt in one of the directions more than in the other direction, such as twice (or more) in one of the directions than in the other. For example, the system 10 may be configured to be able to tilt the object 12 about the first axis 20 by 10 degrees, and to tilt the object 12 about the second axis 30 by 4 degrees. It will be appreciated that this are only non-limiting example values, and that the ranges of tilt that the system 10 may be configured to produce depend widely on the requirements for the system 10.

The actuators 14 and 16 may be substantially identical in configuration, so as to balance the forces put on the object 12, so as to avoid deformation of the object 12, such as bending of the object 12. Similarly, the actuators 24 and 26 may be substantially identical in configuration to avoid unbalanced forces on the object 12. The actuators 14, 16, 24, and 26 may all be substantially identical in configuration.

The system 10 may have any of a wide variety of suitable sizes. In one (non-limiting) embodiment the object 12 may be at least 2.5 cm (1 inch)×2.5 cm (1 inch). In another embodiment the object 12 may be 10 cm (4 inches)×15 cm (6 inches).

FIG. 1B schematically shows a system 60 in which an object 62 is tilted about a pivot point 68 by a first pair of actuators 64 and 66, and a second pair of actuators 74 and 76. The first pair of actuators 64 and 66 may be substantially parallel to the second pair of actuators 74 and 76, with the first pair 64 and 66 and the second pair 74 and 76 on opposite sides of the pivot point 68, and offset the same distance from the pivot point 68.

More broadly, there may be multiple actuators that act together to move the acted-upon object or part (such as a mirror), in any angular direction. The actuators may be pairs that operate in conjunction, with the pairs offset at any of a variety of angles and/or distances, such as perpendicular or parallel, or alternatively there may be actuators that work individually, other than in pairs, to tilt an object. For example, as shown in FIG. 1C, a system 80 could have three actuators 84, 85, and 86, at 120° apart around a pivot point 88, to pivot an object 82. Suitable position/angle sensors in conjunction with the actuators may be used as part of a control system to move an object (such as a mirror) in any direction at the desired rate.

As a further possibility, it is possible for a single actuator to act alone to tilt an object. Such use of a single actuator to drive tilt may be slower and/or less precise than use of multiple actuators in concert.

Figure 3:
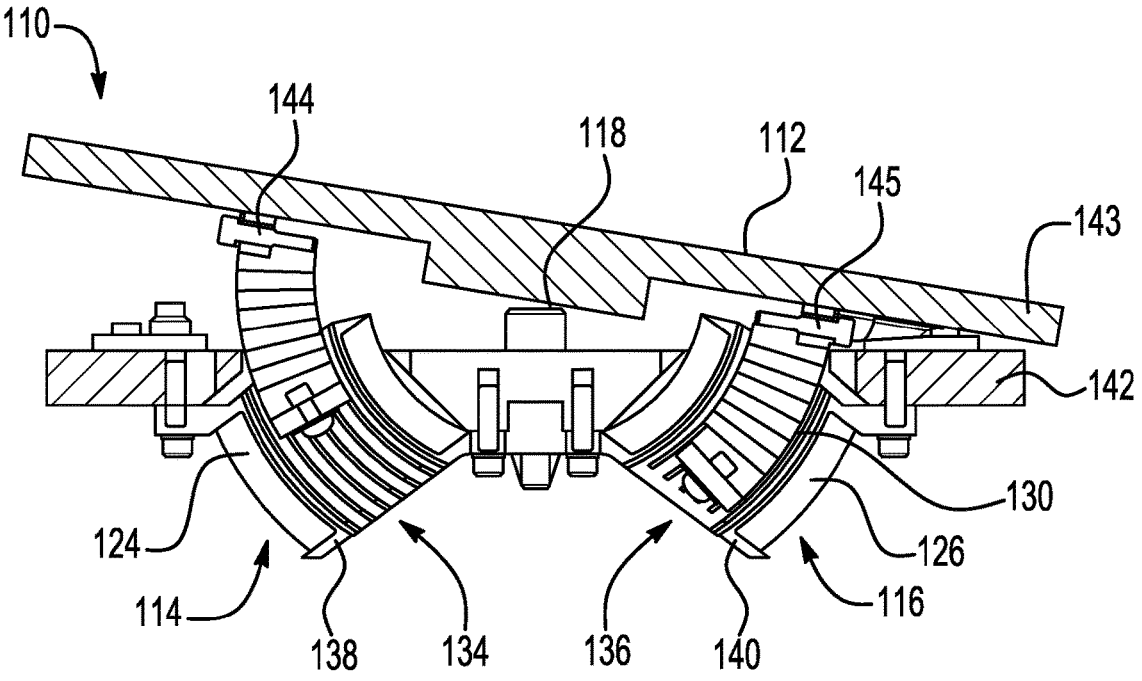
FIG. 3 is a side sectional view showing the actuator system of FIG. 2, in a tilted condition.

FIGS. 2 and 3 show a part of an actuator system 110 according to one embodiment. The system 110 shows an object 112 tilted about a pivot 118 by a pair of actuators 114 and 116. The actuators 114 and 116 are moving-magnet voice coil actuators, in which electricity through respective wire coils 124 and 126 produces magnetic fields that move respective magnetic pieces 128 and 130 through openings 134 and 136 in respective bobbins 138 and 140. The bobbins 138 and 140, with the wire coils 124 wrapped around them, are fixed to a base 142. The magnetic pieces 128 and 130 are attached to a mount 143 for the object 112, by pins or fasteners 144 and 145.

The actuators 114 and 116 may be substantially identical to one another, or at least mirror images of one another, so in the description below only the actuator 116 is described. It should be appreciated that the actuator 116 has corresponding structures.

Figures 4, 5, 6:
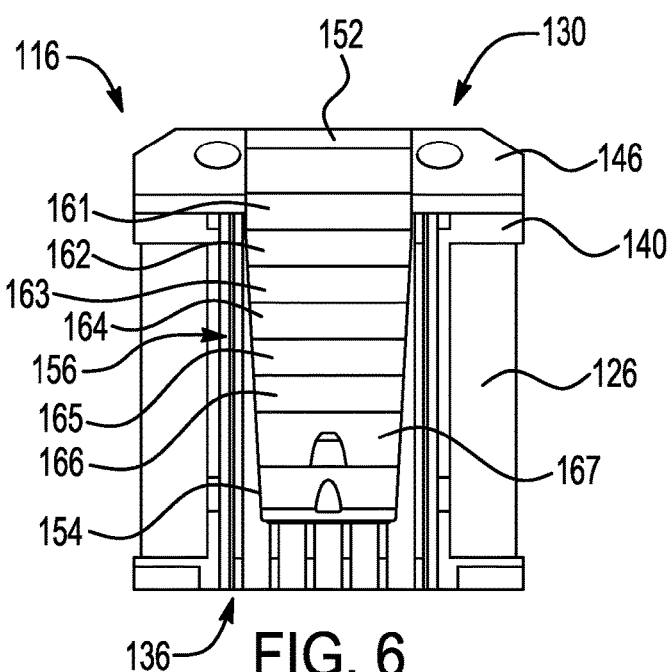
FIG. 4 is an oblique view of a bobbin and magnetic piece of an actuator of the actuator system of FIG. 2.
FIG. 5 is a cutaway view of the bobbin of FIG. 4.
FIG. 6 is a sectional end view of the bobbin of FIG. 4.

With reference now in addition to FIGS. 4 and 5, the opening 136 defined by an inner surface of the bobbin 140 is a non-straight opening. In the illustrated embodiment the opening 136 is a curved opening. The opening 136 alternatively may be described as arced, having a constant radius of curvature, or arcuate. The shape of the opening 136 may correspond to a shape of the magnetic piece 130, which may be similarly curved.

The bobbin 140 may be made of aluminum, or another suitable material, such as another suitable metal. Alternatively the bobbin 140 may be made of a non-metal, such as a suitable plastic. The bobbin 140 may be additively manufactured. Tooling tabs 146 and 148 on the bobbin 140 may facilitate fabrication of the bobbin 140 and assembly of the system 110.

The wire coil 126 wrapped around the bobbin 140 may be made of copper wire, or wire of another suitable material. The coil 126 may be single coil extending over most of, or substantially all of (such as more than 90% or 95% of), a length of the bobbin 140. The wire for the coil 126 may be wound around the bobbin 140 using a slow-speed winding machine.

The magnetic piece 130 includes a proximal pole piece 152 that is attached to the mount 143, a distal pole piece 154 at a free end of the magnetic piece 130, and a stack of magnets 156 between the pole pieces 152 and 154. The stack of magnetics 156 includes multiple magnets 161, 162, 163, 164, 165, 166, and 167 stacked together. In other embodiments the number of magnets in the stack 156 may be greater than or less than that in the illustrated embodiment. In an embodiment, the magnetic piece 130 may be a single arced magnet, instead of a stack of magnets.

The pole pieces 152 and 154 may be made of magnetic steel, or other suitable materials. The magnets 161-167 of the stack 156 may be made of neodymium or other suitable materials.

Sending electric current through the wire coil 126 will produce a magnetic field within the opening 136. This field interacts with the magnetic piece 130 to move the magnetic piece 130 within the opening 136.

With reference now to FIG. 6, the magnet stack 156 may be tapered in one direction, with the width of the magnets 161-167 tapering from widest near the proximate pole piece 152 to narrowest near the distal pole piece 154. The tapering may allow an air gap to be maintained with some tilt of the magnetic piece 130 in a perpendicular direction to the tilt caused by operating of the actuators 114 and 116. This feature may be useful in systems like the systems 10, 60, and 80 (FIGS. 1A-1C) which are configured to tilt an object in different directions (such as perpendicular directions). It will be appreciated that such tapering of the magnets 161-167 may be limited to that necessary to accommodate the tilting, since such tapering increases the air gap and reduces the magnetic forces on the magnetic piece 130, particularly when a smaller amount of the magnetic piece 130 remains in the opening 136.

It will be appreciated that the actuator system 110 may include two additional actuators (not shown) oriented in a direction parallel to that of the actuators 114 and 116, in a manner similar to that of the actuator 60 (FIG. 1B). All four actuators of such a system may be substantially identical in configuration.

Actuators of the system 110 may have the advantages of a greater range of travel, and/or more efficient operation. This advantage may be due at least in part to the curved magnetic pieces and the corresponding non-straight openings they engage, which may allow for more movement while still retaining an air gap. In addition the airgap may be less variable during movement of the magnetic piece (such as the magnetic piece 130) within the bobbin opening (such as the opening 136).

Figures 7, 8, 9:
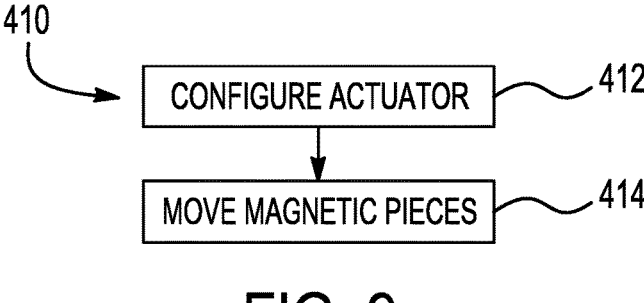
FIG. 7 is a side sectional view showing an actuator system according to yet another embodiment.
FIG. 8 is a side sectional view showing an actuator system according to still another embodiment.
FIG. 9 is a high-level flow chart of a method of tilting an object, according to a further embodiment.

FIG. 7 shows another embodiment, a portion of an actuator system 210 in which two actuators 214 and 216 are used to tilt an object 212. Many features of the actuator system 210 may be similar to those described above with regard to the actuator systems 10, 60, and 80 (FIGS. 1A-1C) and the actuator system 110 (FIG. 2). Thus the actuators 214 and 216 may be substantially identical to one another, and the system 210 may include an additional pair of actuators perpendicular to the actuators 214 and 216.

The similarities with the actuator system 110 (FIG. 2) may include the configuration of the magnetic pieces 228 and 230. For instance the magnetic piece 230 may include a distal pole piece 252 and a proximal pole piece 254, with a stack of magnets 256 in between the pole pieces 252 and 254.

Bobbins 238 and 240 have a different configuration than that of the bobbins 138 and 140 (FIG. 2) described above. For instance the bobbin 240 may a pair of individually straight segments 241 and 243 that are angled to one another, producing an opening 236 that is not straight, but rather is kinked, being made up of separate straight segments. The angled opening 236 allows maintenance of an air gap between the magnetic piece 230 and the bobbin 240 as the magnetic piece 230 moves within the opening 236.

The two segments 241 and 243 have separate respective wire coils 245 and 247 wound around them. The wire coils 245 and 247 may be independently controlled, with current passed through the coils 245 and 247 individually or simultaneously to produce a desired field in the opening 236. This allows for tuning of the magnetic "push" or "pull" forces on the magnetic piece 230, as desired. Such tuning may help compensate for differences between engagement of the magnetic pieces of the actuators 214 and 216. For example, at the far extent of motion of the magnetic piece 230, the coil 247 is not strongly engaged with the magnetic piece 230 to effect motion of the magnetic piece 230. So the energy applied to the coil 247 may be varied to ensure smooth and balanced engagement.

An optional third wire coil 249 may be provided that is outboard of the wire coils 245 and 247, and that is around where the bobbin segments 241 and 243 are joined together. The wire coil 249 may help provide force in the region covered by the wire coils 245 and 247. The optional third wire coil 249, if it is used, may have wire that is thicker than that of the wire coils 245 and 247, and/or may have a higher electrical current than that passed through the wire coils 245 and 247.

FIG. 8 shows another embodiment, an actuator system 310 that has actuators 314 and 316 with bobbins 338 and 340 that may be similar to the bobbins 238 and 240 (FIG. 7), with kinked openings. The bobbin 340 may have wire coils 345 and 347 on respective straight sections or segments 341 and 343, which define a non-straight opening 336. In addition an optional third wire coil that is similar to the optional third wire coil 249 (FIG. 7) may be used.

The magnetic pieces 328 and 330 are different from the magnetic pieces 228 and 230 (FIG. 7) in that the magnetic pieces include a third pole piece. For example the magnetic piece 330, in addition to end pole pieces 352 and 354, includes a middle pole piece 353 that is in the middle of a magnet stack 356 that is between the end pole pieces 352 and 354. The extra (central) pole piece 353 may help improve efficiency in the operation of the actuator system 310.

FIG. 9 shows a high-level flow chart of a method 410 of use of an actuator system, such as any of the actuator systems described above. In step 412 the actuator system is configured with actuators having bobbins that define non-straight openings. In step 414 magnetic pieces are moved within the bobbins to tilt an object.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An actuator comprising:
a moving magnetic piece;
a bobbin defining a non-straight opening through which the moving magnetic piece moves;
a first wire coil around a first length of the bobbin; and
a second wire coil around a second length of the bobbin.

2. The actuator of claim 1, wherein the non-straight opening is a curved opening.

3. The actuator of claim 1, wherein the non-straight opening is a kinked opening.

4. The actuator of claim 1, wherein the bobbin is an aluminum bobbin.

5. The actuator of claim 3, wherein the kinked opening comprises a first straight segment angled in a first direction and a second straight segment angled in a second direction different than the first direction.

6. The actuator of claim 1, wherein the first wire coil and the second wire coil are configured to be independently controlled.

7. The actuator of claim 1, wherein the magnetic piece includes a stack of magnets.

8. The actuator of claim 7, wherein the stack of magnets has a curved shape.

9. The actuator of claim 7, wherein:
the magnetic piece includes pole pieces on ends of the stack of magnets; and
the magnetic piece includes an additional pole piece between the pole pieces on the ends of the stack.

10. The actuator of claim 7, wherein the stack of magnets is a tapered stack of magnets, with magnets varying in width along the stack.

11. The actuator of claim 10, wherein the magnets include a narrowest magnet at a free end of the magnetic piece.

12. The actuator of claim 1, wherein the magnetic piece includes an arced magnet.

13. An actuator system comprising:
a first actuator that includes:
a moving magnetic piece;
a bobbin defining a non-straight opening through which the moving magnetic piece moves;
a first wire coil around a first length of the bobbin; and
a second wire coil around a second length of the bobbin; and
a second actuator.

14. The actuator system of claim 13, further comprising a third actuator used in combination with the first actuator and the second actuator;
wherein the first actuator, the second actuator, and the third actuator are disposed around a pivot point;
wherein the first actuator is configured to tilt an object in a first direction;
wherein the second actuator is configured to tilt the object in a second direction different from the first direction; and
wherein the third actuator is configured to tilt the object in a third direction different from the first direction and the second direction.

15. The actuator system of claim 13, wherein the actuator system has the first actuator and the second actuator on opposite sides of a pivot point, the first actuator and the second actuator being a first pair of actuators configured to tilt an object about the pivot point.

16. The actuator system of claim 15, further comprising a third actuator and a fourth actuator, the third actuator and the fourth actuator being a second pair of actuators configured to tilt the object about the pivot point;
wherein the first pair of actuators is configured to tilt the object in a first direction;
wherein the second pair of actuators is configured to tilt the object in a second direction; and
wherein the first direction is different from the second direction.

17. The actuator system of claim 16, wherein the first direction is perpendicular to the second direction.

18. The actuator system of claim 16, wherein:
the first pair of actuators is configured to tilt the object a first range of angles in the first direction; and
the second pair of actuators is configured to tilt the object a second range of angles in the second direction, with the second range of angles different from the first range of angles.

19. An actuator system comprising:
multiple actuators configured to tilt a mirror;
wherein each of the actuators includes:
a moving magnetic piece;
a bobbin defining a non-straight opening through which the moving magnetic piece moves;
a first wire coil around a first length of the bobbin; and
a second wire coil around a second length of the bobbin.

20. The actuator system of claim 19, wherein the first wire coil and the second wire coil are configured to be independently controlled.

* * * * *